(12) United States Patent
Miyanaga

(10) Patent No.: US 8,113,747 B2
(45) Date of Patent: Feb. 14, 2012

(54) DRILL DUST COLLECTOR

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 701 days.

(21) Appl. No.: 11/813,749

(22) PCT Filed: Dec. 28, 2005

(86) PCT No.: PCT/JP2005/024114
§ 371 (c)(1),
(2), (4) Date: Nov. 13, 2008

(87) PCT Pub. No.: WO2006/075529
PCT Pub. Date: Jul. 20, 2006

(65) Prior Publication Data
US 2009/0172911 A1    Jul. 9, 2009

(30) Foreign Application Priority Data

Jan. 12, 2005    (JP) ................................ 2005-005485

(51) Int. Cl.
*B23B 47/34* (2006.01)
(52) U.S. Cl. .......................................... 408/67; 408/76
(58) Field of Classification Search .................... 408/67, 408/76; B23B 47/34, 45/14; B28D 7/02
See application file for complete search history.

(56) References Cited

U.S. PATENT DOCUMENTS 2,145,939 A * 2/1939 Markley ........................ 175/209
4,662,802 A   5/1987 Osterman
5,113,951 A * 5/1992 Houben et al. .................. 173/75
(Continued)

FOREIGN PATENT DOCUMENTS

DE        195 43 599 A1    5/1997
(Continued)

OTHER PUBLICATIONS

International Search Report for PCT/JP2005/024114, dated Mar. 28, 2006.
(Continued)

*Primary Examiner* — Eric A Gates
(74) *Attorney, Agent, or Firm* — Marshall, Gerstein & Borun LLP

(57) ABSTRACT

Object: A drill dust collector is provided that is capable of drilling holes in an area ranging from a position near a corner to a position distant from the corner and that can be positioned with a side face in contact with an upright face such as a wall during drilling.

Means for Solving: The drill dust collector has (i) an opening 2C provided in the upper face of a box having an open lower face 1C, for receiving a drill inserted therein; (ii) a suction port 1U connected to the leading end of a suction hose 3 connected to an suction apparatus; and (iii) a contact member 1A of high flexibility formed so as to extend around the lower face of the box. The box has a lid member 3 composed of the opening 2C and its peripheral part, and a box body 1. The lid member 3 is placed so as to be rotatable relative to the box body 1 and the opening 2C is located at a position the center of which is shifted from the center of rotation of the lid member 3 relative to the box body 1.

10 Claims, 9 Drawing Sheets

U.S. PATENT DOCUMENTS

| | | | | |
|---|---|---|---|---|
| 5,605,421 | A * | 2/1997 | Hodgson | 408/67 |
| 5,807,034 | A * | 9/1998 | Perlmutter et al. | 408/67 |
| 8,052,357 | B2 * | 11/2011 | Bruntner | 408/67 |
| 2003/0170082 | A1 * | 9/2003 | Garcia et al. | 408/1 R |
| 2005/0000052 | A1 * | 1/2005 | Byles | 15/314 |
| 2009/0148248 | A1 * | 6/2009 | Nishikawa et al. | 408/67 |
| 2009/0181606 | A1 * | 7/2009 | Loveless et al. | 451/456 |
| 2009/0317200 | A1 * | 12/2009 | Bruntner | 408/67 |

FOREIGN PATENT DOCUMENTS

| | | | |
|---|---|---|---|
| DE | 19951479 A1 * | 5/2000 | |
| FR | 2770991 A1 * | 5/1999 | |
| FR | 2902032 A1 * | 12/2007 | |
| GB | 2 262 159 A | 6/1993 | |
| GB | 2262159 A * | 6/1993 | |
| GB | 2366224 A * | 3/2002 | |
| JP | 58-15830 | 1/1983 | |
| JP | 59-124010 | 8/1984 | |
| JP | 62-215774 | 9/1987 | |
| JP | 09-271621 | 10/1997 | |
| JP | 11-501873 | 2/1999 | |
| JP | 2005-138270 | 6/2005 | |
| RU | 22358 | 12/2008 | |
| WO | WO-94/25219 | 11/1994 | |
| WO | WO-99/44786 | 9/1999 | |

OTHER PUBLICATIONS

Supplementary European Search Report for EP 05 84 4856, dated Aug. 26, 2008.

* cited by examiner

DRILL DUST COLLECTOR

TECHNICAL FIELD

The invention relates to a drill dust collector (hereinafter simply called "a dust collector") that is attached to a drill (the term "drill" used herein has a wide range of definitions including core drills) for drilling holes in an object such as metals, stone, cement, wood, composite materials and others, in order to collect dusts (cutting powder etc.) generated during drilling operation (also called "boring operation").

BACKGROUND ART

When drilling a hole in an object such as metals, stone, cement, wood, composite materials and others, dusts mainly including cutting powder (cutting powder plus cutting fluid in the case of wet cutting) are generated. To remove the dusts, there has been proposed a drill dust collector (also called "a dust collector") (Patent Document 1). According to this dust collector, during drilling operation, at least the leading end portion of the drill is covered with a box-like cover (referred to as "box") except an opening through which the drill is inserted, and the inside of the box is communicated with an suction apparatus through a hose such that the dusts such as cutting powder generated within the box are drawn into the suction apparatus, thereby preventing the dusts from scattering around.

Patent Document 1: Japanese Utility Model Application Laid-Open Publication No. 59-124010

DISCLOSURE OF THE INVENTION

Problems that the Invention Intends to Solve

Suppose the above drill dust collector and the drill are used to make a hole at a corner of a floor, ceiling or wall face (these are represented by "floor face" in this specification and claims) which corner is defined by two upright faces (such as floor faces, ceiling faces and wall faces). In this case, the peripheral side faces of the box of the dust collector, which box has negative inner pressure, come into contact with the upright corner faces and this often hinders positioning. In such a condition, the box cannot be made closer to the corner for drilling. On the other hand, if drilling is performed to make a hole at a position further from the corner, the peripheral side faces of the box are out of contact with and therefore unsupported by the two upright corner faces. As a result, the drilling operation has to be performed with the drill unstably positioned. In short, drilling can be performed with proper positioning only when the opening is positioned such that a peripheral side face of the box is in contact with an upright corner face. In cases where a core drill having no center drill is used, positioning has to be done without use of a center drill so that positioning becomes more difficult.

In addition, since the leading end portion of the drill is entirely covered with the box of the dust collector, the condition of the drill cannot be checked with eyes while the leading end of the drill is positioned. Additionally, if drills having a variety of diameters are used with a dust collector in which the opening for receiving the drill inserted therein is fixedly formed on the upper face of the box, the following inconvenient situations may arise: A clearance is created between the outer periphery of the drill used and the opening for receiving the drill, or a selected drill cannot be inserted into the hole.

Further, where the object to be drilled is concrete or the like, the dust collector is sometimes attached to a so-called wet-type drill that uses water as a cutting fluid. In this case, mud or the like generated from the cutting fluid and dusts (cutting powder) often adheres to the part of the dust collector which is in contact with the floor face, with the result that the floor face becomes heavily dirty.

The present invention has been made taking account of the above problems. Therefore, a primary object of the invention is to provide a drill dust collector with which, when performing drilling in a corner area of a floor or the like, holes can be quickly drilled over a specified range of area from a position closer to the corner to a position distant from the corner. This drill dust collector can be positioned with the peripheral side faces of the box being in contact with both corner faces that constitute the corner within the specified area. A second object of the invention is to provide a drill dust collector that does not get the floor being drilled dirty over a wide range of area.

Means of Solving the Problems

The above objects can be accomplished by drill dust collectors having structures described below.

According to a first aspect of the invention, there is provided a drill dust collector comprising a box that opens in a lower surface thereof and has an opening on an upper surface thereof through which a drill is inserted, wherein a suction port for making the inner pressure of the box negative is formed in the box, being connected to the leading end of a suction hose the proximal end of which is connected to an suction apparatus, and wherein a contact member having high flexibility (sealing ability) is provided so as to extend around the lower face of the box, the box having a lid member composed of the opening and a peripheral portion defining the opening and a box body that is open at the lower face and provided with the suction port, wherein the lid member is arranged so as to be rotatable relative to the box body and the opening is formed at a position the center of which is shifted from the center of rotation of the lid member relative to the box body.

In the drill dust collector of the above-described structure according to the first aspect of the invention, when starting drilling, the lid member is rotated relative to the box body, thereby changing the position of the opening formed on the lid member in relation to the box body, so that a peripheral side face of the box (the rim of the box) can be brought into contact with at least one of the corner faces and in this condition, positioning and drilling can be performed over a wide range of area. With this arrangement, positioning can be done by means of the box and the opening even if a core drill having no center drill is used.

In addition, by rotating the lid member relative to the box body, the opening can be quickly arbitrarily made close to or kept away from the corner defined by the corner faces.

In the dust collector according to the first aspect, at least a part of the lid member may be made from a transparent or semi-transparent material. This enables it to visually check the position of the drill etc. before and during drilling operation. Therefore, drilling with accurate positioning can be ensured. As a matter of course, the whole box may be made from a transparent or semi-transparent material.

In the dust collector according to the first aspect, a surface of the box body may be provided with scale marks aligned at specified intervals. With this arrangement, positioning of the drill etc. can be done by use of the scale marks before and during drilling operation. Therefore, drilling can be carried out while ensuring accurate positioning. In a preferable arrangement, a first series of scale marks and a second series of scale marks are aligned in two directions perpendicular to each other, which is convenient for planar positioning.

In the dust collector according to the first aspect, the box body may have, at least at its leading end, an angled part having an angle of 90 degrees or less when viewed in plan. This angled part is unlikely to come into contact with the two corner faces so that the angled part can be made close to the corner defined by the two corner faces. Therefore, drilling can be performed at positions closer to the corner.

In the dust collector according to the first aspect, the suction hose may be flexible and arranged so as to be integral with the suction port. With this arrangement, the rigidity of the joint does not increase, so that the hose can be uniformly and smoothly bent up to the vicinity of the suction port. Accordingly, the joint where the suction port and the suction hose are connected to each other has increased flexibility (curvature) and, in consequence, a dust collector easy to handle can be achieved.

In the dust collector according to the first aspect, a partition wall for partitioning the suction port and the opening from each other may be provided within the box body so as to circumferentially extend when viewed in plan, and the partition wall may be provided with a communication hole that makes communication between the suction port and the opening. This enables a structure in which the condition of negative pressure within the space enclosed by the partition wall can be constantly maintained over the entire area. As a result, more stable and efficient dust collection can be carried out during drilling operation.

In the dust collector according to the first aspect, the partition wall may be formed in the shape of a circle when viewed in plan and located radially outside of the peripheral edge of the lid member when the lid member is attached to the box body. This allows the lid member to have a simple plate-like structure. Since the lid member has such a simple structure, a plurality of lid members having openings of different diameters can be easily prepared so that one that has an opening corresponding to the outer diameter of a drill to be used can be selected from them to attach to the box body. Accordingly, a dust collector having an opening that matches the outer diameter of a drill (or core cutter) to be used can be easily attained. In this case, generated dust etc. can be smoothly collected. Even if the partition wall is disposed integrally with the lid member, the same functional effect can be achieved by preparing a plurality of lid members having openings of different diameters.

The second object can be accomplished by the dust collector having the following structure.

According to a second aspect of the invention, there is provided a drill dust collector wherein an opening for receiving a drill inserted therethrough is formed on the upper face of a box the lower face of which is opened, wherein a suction port for making the inner pressure of the box negative is formed in the box, being connected to the leading end of a suction hose the proximal end of which is connected to an suction apparatus, and wherein a contact member having high flexibility (sealing ability) is provided so as to extend around the lower face of the box, wherein a partition wall for partitioning the suction port and the opening so as to make them independent from each other is provided within the box so as to circumferentially extend when viewed in plan, wherein the space located radially outside of the partition wall within the box body is divided into upper and lower spaces independent from each other by a dividing wall, and wherein the partition wall is provided with a communication hole for making communication between the suction port and the opening which communication hole is located above the dividing wall.

In the drill dust collector according to the second aspect having the above structure, the cutting powder, cutting fluid and a mud-like mixture thereof generated on the inner side of the partition wall owing to the above structure are guided into the upper space above the dividing wall located outside the partition wall through the communication hole. Then, the cutting powder and others are guided from the upper space to the suction port. Therefore, the cutting powder, cutting fluid and mud-like mixture generated on the inner side of the partition wall do not adhere to the outer peripheral part of the lower face of the box body and, in consequence, the wall, floor or the like is not contaminated with them over a wide range of area. Additionally, a structure, which allows the condition of negative pressure within the partition wall to be kept constant over the entire area, can be realized by providing the partition wall with a plurality of said communication holes that are aligned at appropriate intervals in a circumferential direction of the partition wall. In consequence, more stable and efficient dust collection can be carried out during drilling operation.

In the dust collector according to the second aspect, the suction port may be formed on a side face of the box, which is desirable in view of smooth suction.

In the dust collector according to the second aspect, the dividing wall may extend to a joint part of the suction hose. This enables all of the cutting powder, cutting fluid and mud-like mixture thereof to be smoothly guided to the suction hose side.

EFFECTS OF THE INVENTION

According to the drill dust collector of the first aspect described above, when performing drilling in a corner area of a floor or the like, holes can be quickly drilled over a wide range of area from a position near the corner to a position distant from the corner and positioning can be done with a peripheral side face of the box being in contact with a wall face (or upright member).

According to the drill dust collector of the second aspect described above, the floor, wall or the like to be drilled is not contaminated with dirt within a short period of time.

EXPLANATION OF REFERENCE NUMERALS

A: drill dust collector (dust collector)
1: box body
1A: contact member
1C: lower face
1T: communication hole
1U: suction port
1W: partition wall
2: lid member
2C: opening
3: suction hose

BEST MODE FOR CARRYING OUT THE INVENTION

First Embodiment

Referring now to the accompanying drawings, the drill dust collector of the first aspect of the invention will be described according to one embodiment.

Figure 1:
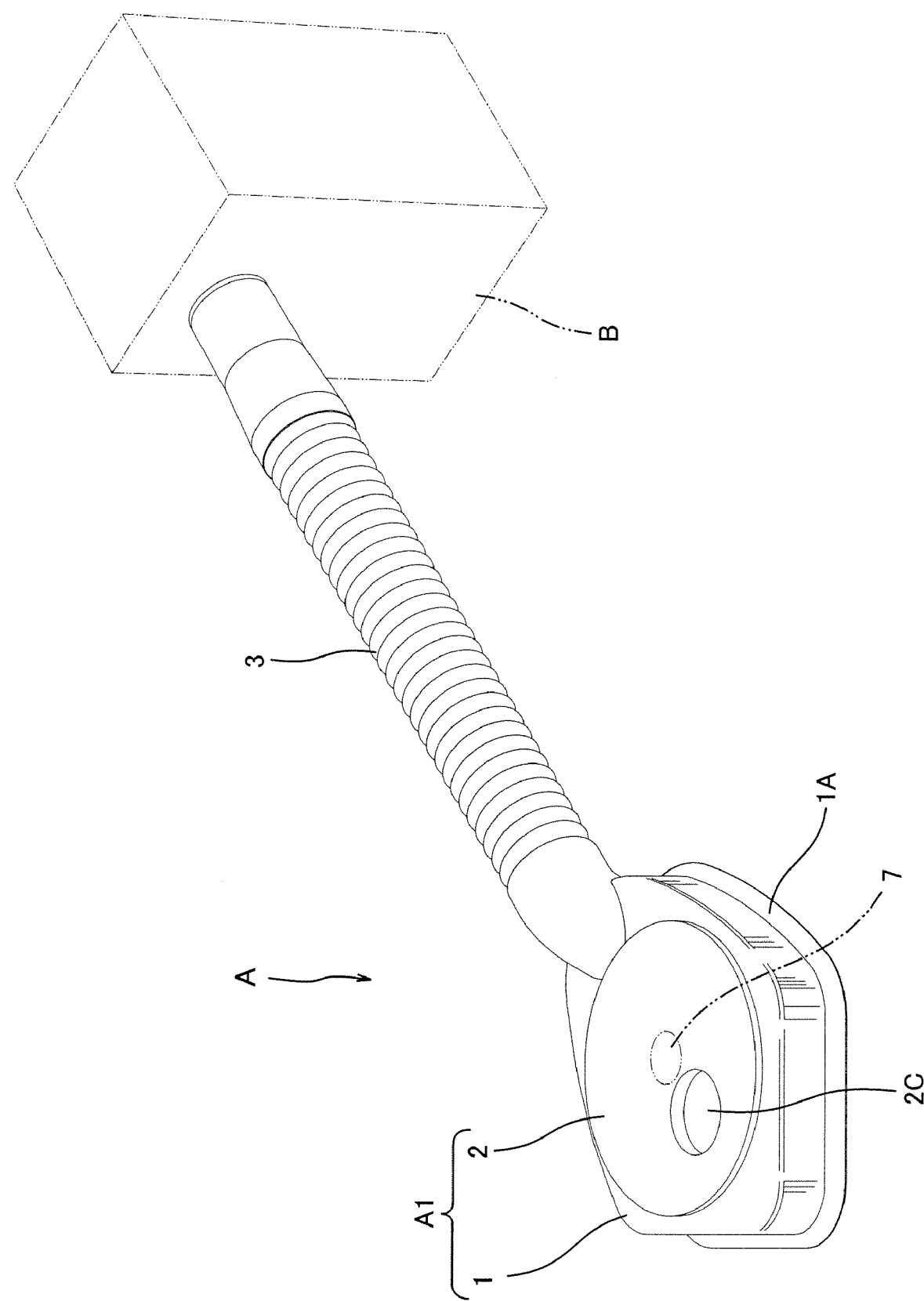
FIG. 1 is a perspective view illustrating an overall external appearance (external configuration) of a drill dust collector of one embodiment according to a first aspect of the invention.

In FIG. 1, A denotes a drill dust collector. This dust collector A has a box body 1; a lid member 2 that is separated from the box body 1 and circular in shape when viewed in plan; and a suction hose 3 that has an inner hose passage communicating with a suction port 1U (see FIGS. 4, 7) formed in the box body 1 and that is integral with the box body 1. The box body 1 and the lid member 2 constitute a box A1.

Figure 2:
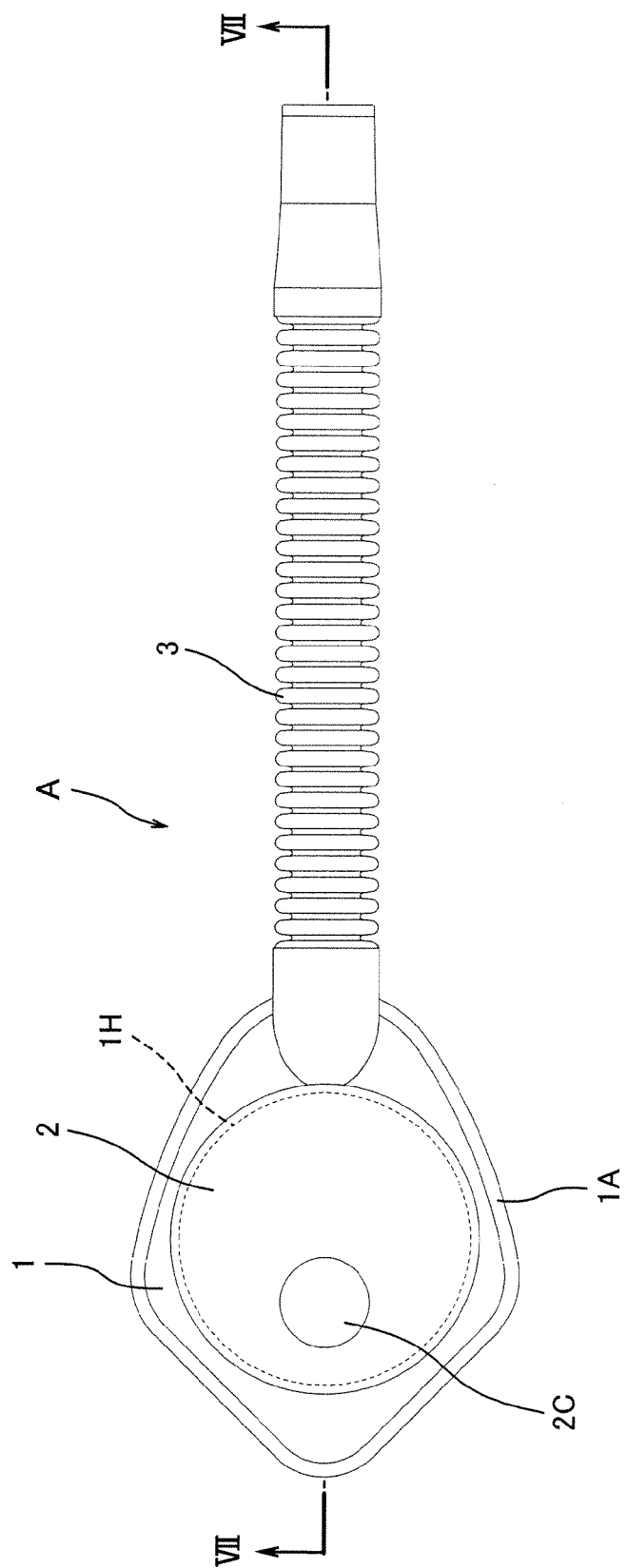
FIG. 2 is a plan view illustrating the structure of the dust collector shown in FIG. 1.
Figure 3:
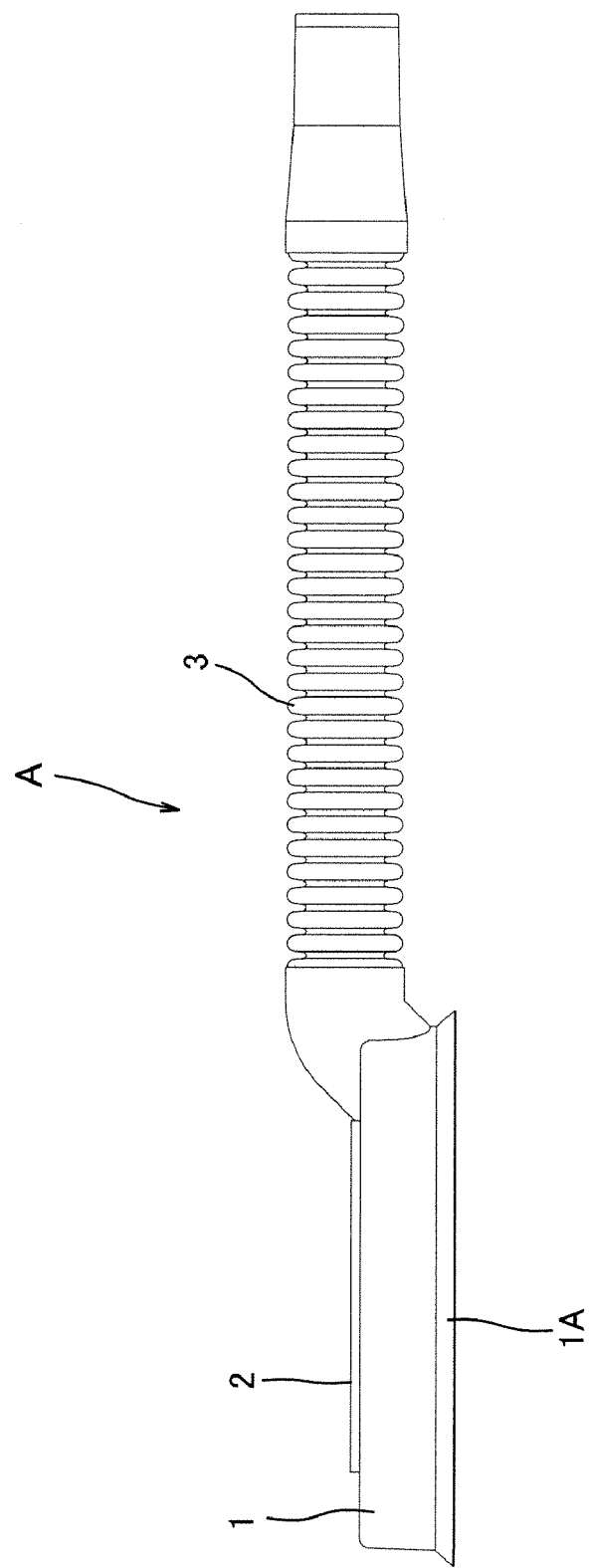
FIG. 3 is a side view illustrating the structure of the dust collector shown in FIG. 1.
Figure 4:
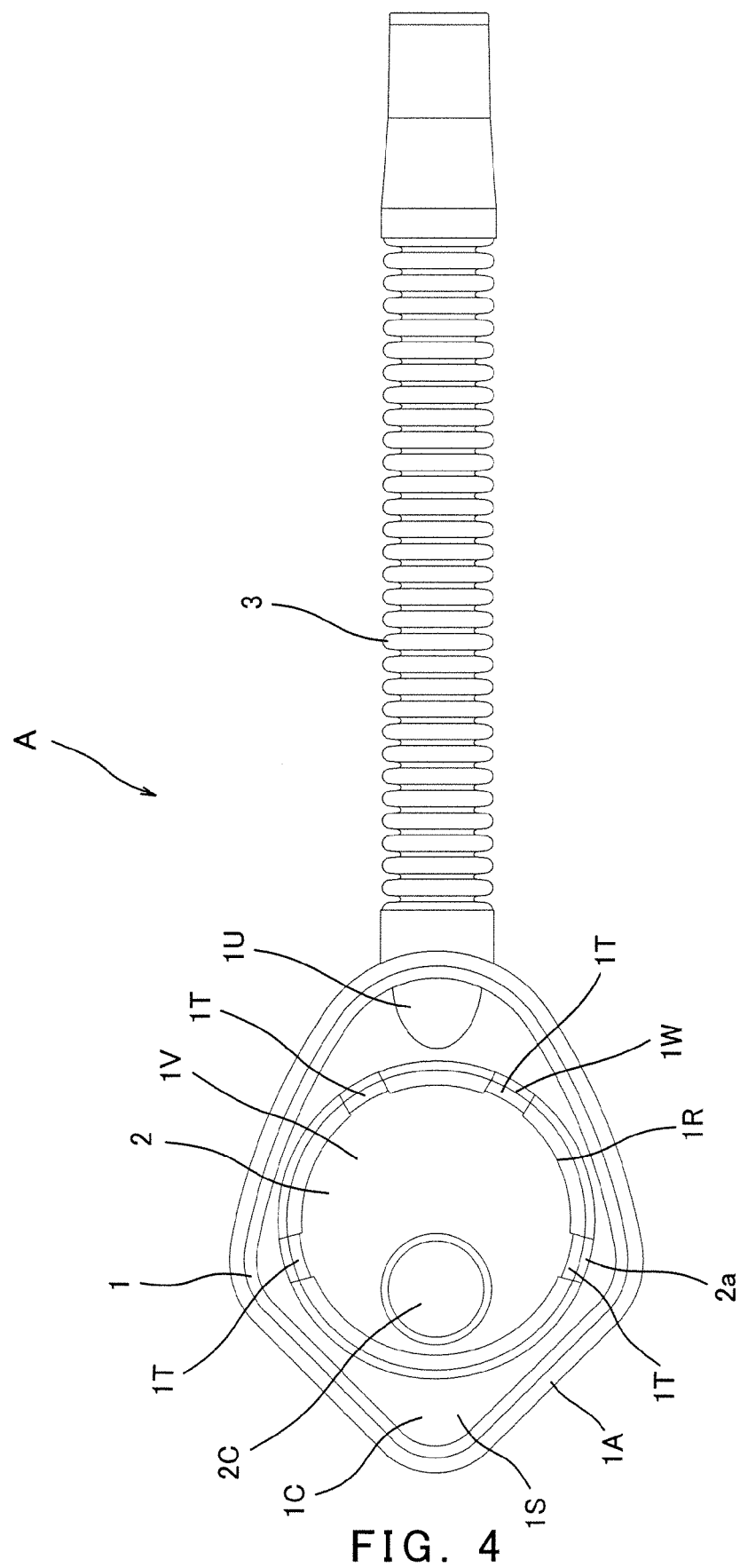
FIG. 4 is a bottom view illustrating the structure of the dust collector shown in FIG. 1.
Figure 5:
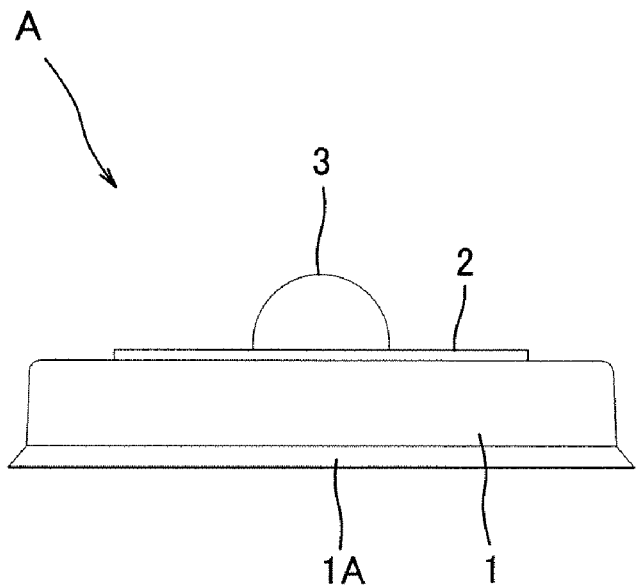
FIG. 5 is a front view illustrating the structure of the dust collector shown in FIG. 1.
Figure 6:
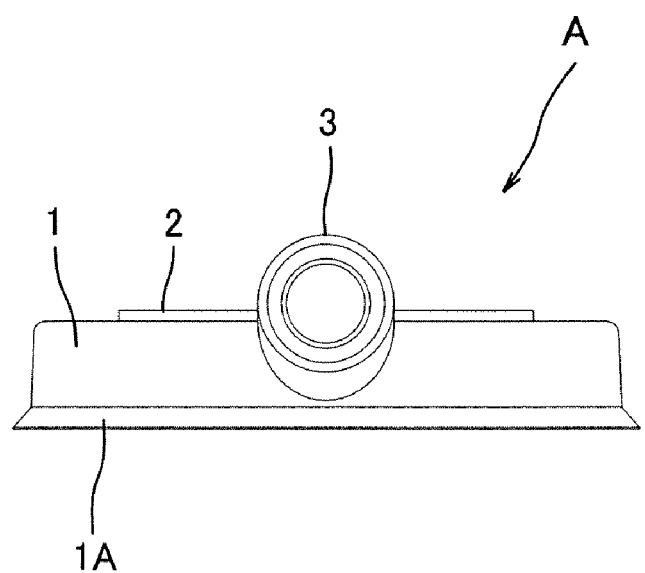
FIG. 6 is a rear view illustrating the structure of the dust collector shown in FIG. 1.
Figure 7:
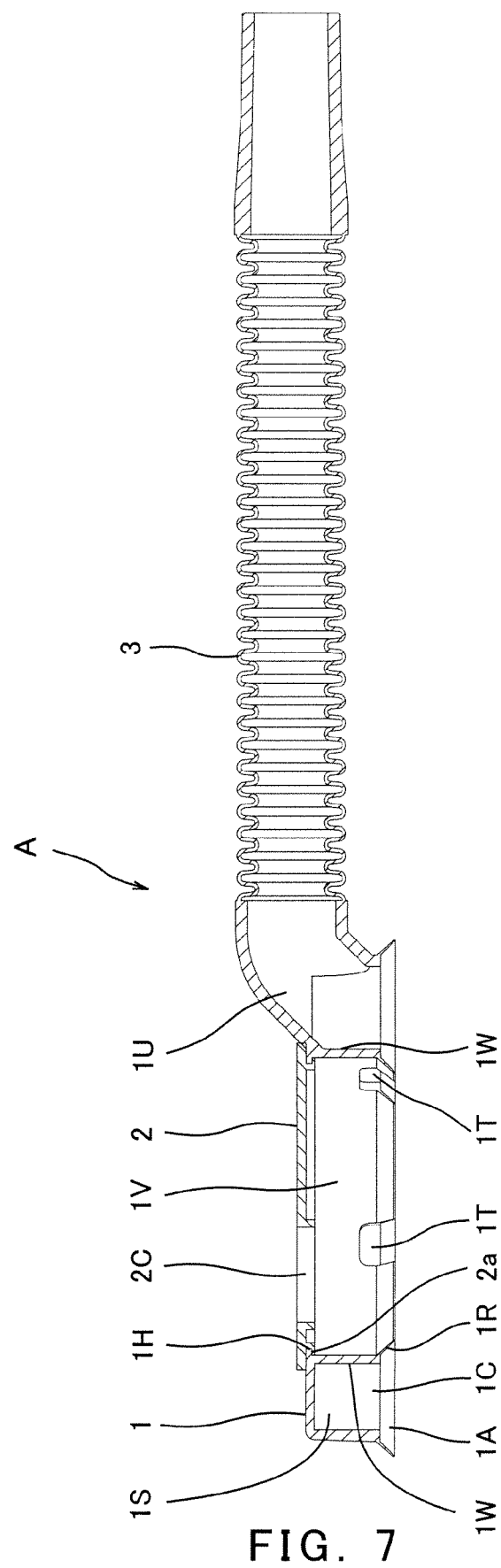
FIG. 7 is a sectional view taken along line VII-VII of FIG. 2.

When viewed in plan, the box body 1 is substantially rhombic in shape and has rounded corners as illustrated in FIG. 2. The box body 1 is in the form of a box (see FIGS. 1 to 3, FIG. 5, FIG. 6) having specified height. As illustrated in FIGS. 4, 7, the lower face 1C of the box body 1 is entirely open. The peripheral edge of the lower face 1C is provided with a contact member 1A that has flexibility (sealing ability) and is integrally provided therewith so as to project outward. This contact member 1A is in the form of a thin film gradually thinning toward the outside so that the gap between the work surface of an object to be processed and the box body 1 can be sealed off.

As illustrated in FIGS. 4, 7, etc., the suction port 1U is formed at one corner (i.e., the corner of the rear part of the rhombic upper face which corner has an angle narrower than 90 degrees) of the upper face of the box body 1. As seen from FIGS. 2, 4, the corner at which the suction port 1U is formed is rounded so as to have curvature radius greater than those of other corners. The suction hose 3 extends from one end of the suction port 1U such that they communicate with each other as shown in FIGS. 4, 7. The proximal end of the suction hose 3 is connected to the suction port side of an suction apparatus (dust catcher) B such that air is suctioned by the suction hose 3 through the suction port 1U to make the inner pressure of the box body 1 negative.

As illustrated in FIGS. 2, 4, the angle of the corner of the box body 1 opposed to the corner at which the suction port 1U is formed is narrower than 90 degrees. In this embodiment, the contained angle of the corner is approximately 75 degrees but is not necessarily limited to this. The corner may have, for instance, other angles than 90 degrees such as 60 to 85 degrees as far as they are narrower than 90 degrees. On the upper face of the box body 1, an open hole 1H is formed, which is circular in shape when viewed in plan and in which the lid number 2 is fitted. A projecting ring-shaped collar 2a is formed on the bottom face of the lid member 2 as illustrated in FIGS. 4, 7. The outer circumference (outer diameter) of the ring-shaped collar 2a is approximately equal in size to (and, more precisely, slightly larger than) the open hole 1H. The box body 1 and the lid member 2 are both made from hard rubber (or flexible plastic). Therefore, if the lid member 2 is put into the open hole 1H of the box body 1 with pressing force, the lid member 2 will be integrally, rotatably fitted in the open hole 1H of the box body 1 as illustrated in FIGS. 1, 2, 4 etc.

In this embodiment, the lid member 2 is entirely formed from a substantially transparent material in order that the status of the drill housed in the box body 1 can be visually checked. It is also possible to make the lid member 2 from a semi-transparent material through which the inside of the box body 1 can be somewhat seen. It should be noted that if the box body 1 is entirely or partially formed from a transparent or semi-transparent material or alternatively, a window 7 (indicated by chain double-dashed line in FIG. 1) for visual check is provided in the box body 1 or the lid member 2, the status of the drill housed in the box body 1 can be similarly checked with eyes.

Figure 8:
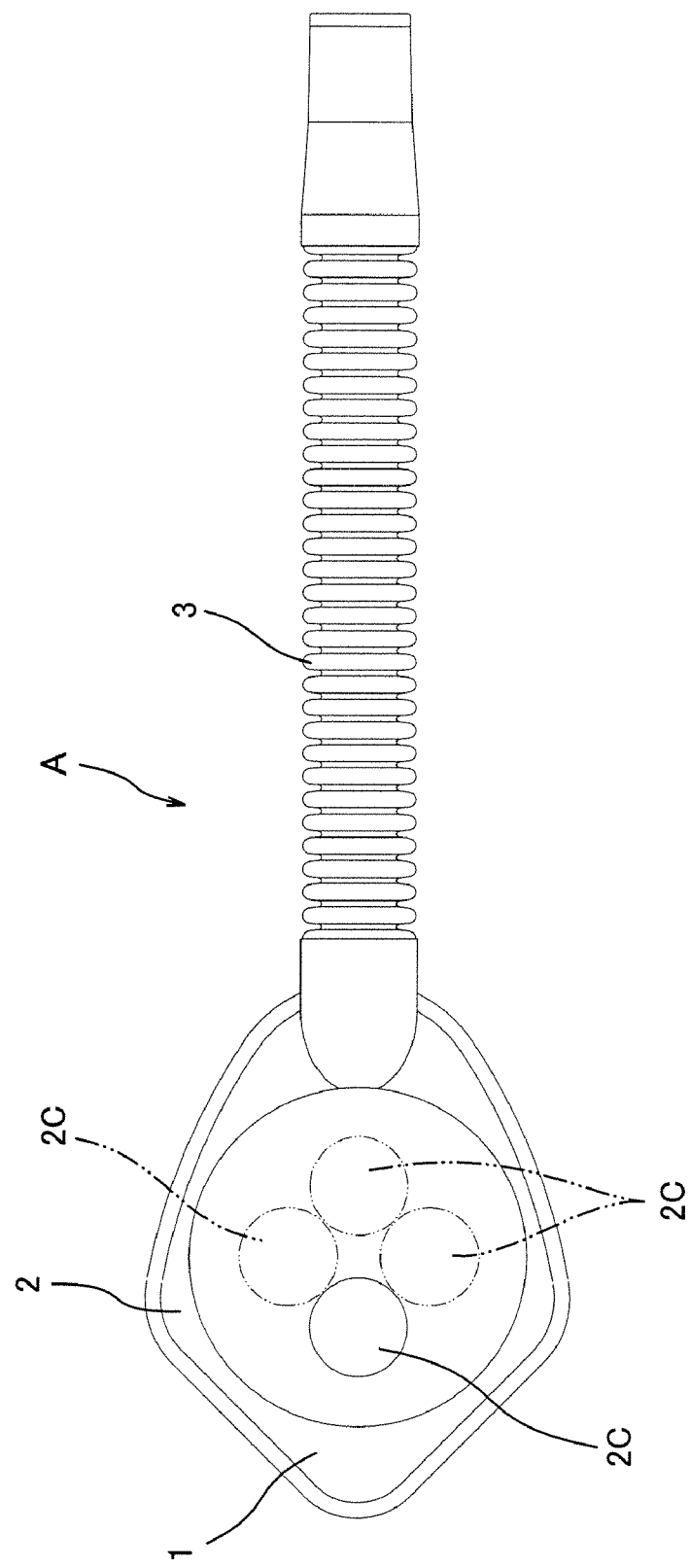
FIG. 8 is a plan view illustrating, with chain double-dashed line, a state in which a lid member is rotated relative to a box body.

As illustrated in FIGS. 1, 2, 8, etc., the lid member 2 is provided with an opening 2C which is circular in shape when viewed in plan and has a center shifted from the center of the lid member 2 which is also circular when viewed in plan. The drill passes through this opening 2C when inserted its leading end directed to the lower face of the box body 1. The position of the opening 2C can be changed in relation to the box body 1 as illustrated by solid line and chain double-dashed line in FIG. 8, by rotating the lid member 2 relative to the box body 1.

In this embodiment, a circle-shaped (ring-shaped) partition wall 1W is formed radially outside of the open hole 1H of the box body 1, defining the periphery of the open hole 1H, as illustrated in FIGS. 4, 7. The partition wall 1W extends from the upper face to the lower end such that a space 1S where the suction port 1U of the box body 1 is positioned and a space 1V where the opening 2C is positioned (i.e., the space where the open hole 1H is positioned) are separated from each other. Although not concretely shown in the drawings, in another embodiment, the partition wall 1W in the form of a circle (ring) may be formed in the lid member 2 so as to be attached to the outer peripheral edge of the lid member 2, so that the space 1S where the suction port 1U of the box body 1 is positioned and the space 1V where the opening 2C is positioned (i.e., the space where the open hole 1H is positioned) are separated from each other.

As illustrated in FIGS. 4, 7, the lower end face (the bottom end face) of the partition wall 1W is provided with a contact member 1R that is integrally formed therewith and extends radially inward within the open hole 1H. This contact member 1R has high flexibility (sealing ability) and is in the form of a thin film gradually thinning in a radially inward direction so that the gap between the work surface of an object to be processed and the space 1V where the opening 2C (and the open hole 1H) is positioned can be sealed off.

The partition wall 1W has a plurality of communication holes 1T. In this embodiment, four communication holes 1T are provided in total. Concretely, two communication holes 1T are provided at positions which are shifted from the front part of the suction port 1U in both sideward directions, whereas another two communication holes 1T are provided at positions located on a phantom line that extends in a direction substantially perpendicular to the longitudinal direction of the suction hose 3 and located on a phantom line that extends in a radial direction of the open hole 1H. The number of communication holes 1T is not necessarily limited to four but may be six or more. Their positions can be arbitrarily determined. However, it is undesirable to provide the communication hole 1T in a position just in front of or nearly in front of the suction port 1U, because if the communication hole 1T is provided in such a position, the amount of air suctioned through the communication hole 1T increases so that the negative pressure in the space 1S enclosed by the partition wall 1W, the outer peripheral wall of the box body 1 and the upper face cannot be stably maintained. Therefore, if the communication hole 1T is formed in the above position, it is advisable to take countermeasures such as making the diameter of the communication hole 1T small.

In this embodiment, the suction hose 3 is of a bellows type and therefore can be easily bent with a small bend radius. The suction hose 3 is made from the same hard rubber (or flexible plastic) as of the box body 1. This facilitates bending of the suction hose 3 with a small bend radius, in cooperation with the bellows form of the suction hose 3.

In a preferred embodiment, it is desirable to prepare a plurality of lid members 2 the openings 2C of which have different diameters or different diameter ranges. By selectively using the lid member 2, the gap (space) between the opening 2C and the outer periphery of the drill used can be maintained to necessity minimum. For instance, the lid members 2, whose openings 2C have diameters of 10 mm, 14 mm and 18 mm, may be prepared.

The dust collector A of the above structure has the following functional effect. The drill dust collector A is placed on the working surface of the object to be drilled such that the contact member 1A and the contact member 1R come into contact with the working surface and such that the opening 2C is placed at a position where drilling is to be performed. Of course, when performing drilling operation, the proximal end of the suction hose 3 of the dust collector A is connected to the suction apparatus B. In the case where a plurality of lid members 2 the openings 2C of which have different diameters are prepared, the lid member 2 having the opening 2C corresponding to the outer diameter of the drill to be used is selected and attached to the box body 1.

When inserting the drill from the opening 2C of the dust collector A such that the leading end of the drill comes into contact with the working surface, it is possible to visibly check from the outside of (above) the lid member 2 whether the position of the drill is in line with the position of the hole to be formed, thanks to the substantially transparent material of the lid member 2.

In addition, in the case of the dust collector A, if drilling operation is performed on the working surface such as a floor face located between two upright wall faces the ends of which are in contact with each other when viewed in plan, the position of the leading end of the drill can be made coincident with the position of the hole on the floor face to be drilled by changing the position of the opening 2C through a rotation of the lid member 2 relative to the box body 1 in the condition in which either or both of the side faces of the dust collector A are in contact with the wall faces.

In addition, if the confined angle between the two wall faces is less than 90 degrees or an object projects from either wall face toward the other wall face, the dust collector A can be placed between these two wall faces, owing to the substantially rhombic shape of the box body 1 in which the corner corresponding to its leading end has an angle of less than 90 degrees. Thanks to not only such a configuration but also the position of the opening 2C the center of which is shifted from the center of the lid member 2, drilling operation can be carried out with the drill that is positioned in a specified range of area from a position close to a corner defined by the two wall faces to a position distant from the corner, in such a condition that the side faces of the box body 1 are in contact with both wall faces defining the corner in the specified area.

By rotating a rotatable tool (e.g., an electric drill or pneumatic drill) after turning the suction apparatus B ON with the drill being positioned in line with the position of the hole to be formed, the drill performs drilling operation on the working surface. The dust such as cutting powder generated in the drilling operation is drawn from the space 1V where the opening 2C is positioned into the space 1S through the communication holes 1T. Then, the dust is drawn from the suction hose 1U communicating with the space 1S into the suction hose 3. During this dust collecting operation, the space 1S on the inner side of the outer peripheral wall of the box body 1 is stably maintained in a substantially specified negative pressure state, because the space 1S is separated from the space 1V provided with the opening 2C by the partition wall 1W as described earlier and air-suctioned through the communication holes 1T around the partition wall 1W. As a result, a stable dust collection function can be attained.

In addition, since the suction hose 3 is integrally formed with the box body 1 having the suction port 1U and has the shape of a bellows as described earlier and since the suction hose 3 is made from hard rubber or flexible plastic as described earlier, drilling operation can be carried out in a narrow space by bending the suction hose 3 so as to have a small bend radius.

In a modified example, the box body 1, the lid member 2 and the suction hose 3 may be all made from a transparent or semi-transparent material. This is more preferable because positioning of the drill, drilling condition and dust collecting condition can be visually checked.

The drill dust collector of the invention can be applied not only to so-called dry-type drills but also to wet-type drills that use cutting fluid (cutting water). In the wet-type drill application, most of the water can be collected by the suction apparatus together with dust.

Second Embodiment

Next, a drill dust collector according to a second embodiment of the invention will be concretely described with reference to the drawings. This dust collector is well suited for use with a wet-type drill.

Figure 9:
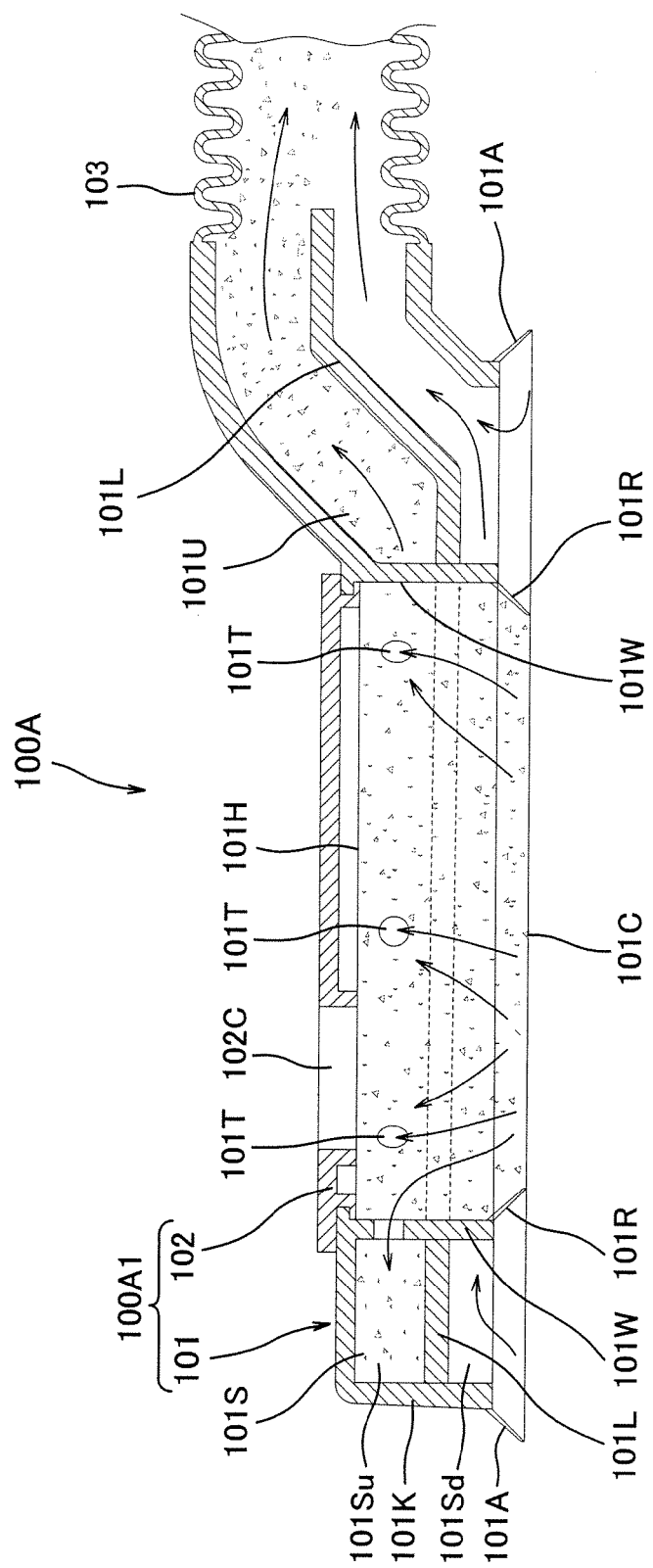
FIG. 9 is a sectional side view illustrating the structure of an essential part of a drill dust collector of one embodiment according to a second aspect of the invention.

The dust collector A of this embodiment differs from that of the first embodiment in the structure of the box body 1, as seen from FIG. 9 that is an enlarged view of an essential part of the dust collector A. Therefore, only the different point will be described below. Specifically, the box body 101 has, at a corner thereof, a suction port 101U which proximal end is connected to the suction apparatus. The box body 101 has a lower face 101C at the bottom part thereof. The box body 101 is provided with a partition wall 101W that extends circumferentially and partitions the suction port 101U and the lower face 101C from each other. The partition wall 101W extends so as to define the outer periphery of an open hole 101H formed on the upper face of the box body 101. At the vertically mid position of the partition wall 101W, there is provided a dividing wall that divides a space 101S enclosed by the partition wall 101W and the outer peripheral wall 101K of the box body 101 into upper and lower independent spaces 101S$u$, 101S$d$. The partition wall 101W defining the upper space 101S$u$ of the space 101S, which space 101S$u$ is upper than the dividing wall 101L, is provided with a plurality of communication holes 101T for making communication between the space 101S$u$ and the space on the inner side of the partition wall 101W. These communication holes 101T are properly spaced. In this embodiment, ten communication holes 101T are arranged at equal intervals in a circumferential direction of the ring-shaped partition wall 101W.

The lower space 101S$d$ is positioned under the upper space 101S$u$ with the dividing wall 101L between.

The dividing wall 101L has a portion extending from the suction port 101U to the leading end of the suction hose 103, so that the upper space 101S$u$ communicates with the lower space 101S$d$ at the end of the extending portion of the dividing wall 101L, in other words, at the leading end of the suction hose 103. In another example, the dividing wall 101L may be modified so as to continuously extend to the joint position where the suction hose 103 is connected to the suction port 101U. By extending the dividing wall 101L at least to the joint position, dust (e.g., cutting powder), cooling water and a mixture thereof within the partition wall 101W can be guided from the space on the inner side of the partition wall 101W to the upper space 101S$u$ through the communication holes 101T and collected from the upper space 101S$u$ by the suction hose 103. In other words, dust (e.g., cutting powder), cooling water and a mud-like mixture thereof are not collected in nor allowed to pass through the lower space 101S$d$. Therefore, the lower space 101S$d$ is not contaminated with soil matter etc.

In this embodiment, a thin-film-like contact member 101A of high flexibility is formed integrally with the lower end face of the box body 101, whereas a thin-film-like contact member 101R of high flexibility is formed integrally with the lower end face of the partition wall 101W.

Since the dust collector 100A of this embodiment having the box body 101 of the above structure is configured to have the upper and lower spaces 101S$u$, 101S$d$ which are completely separated (independent) from each other by the partition wall 101W, the dividing wall 101L and the contact member 101R, dust (e.g., cutting powder), cooling water and a mud-like mixture thereof do not flow into the lower space Sd and therefore the floor face is not made dirty by the contact member 101R over a wide range of area unlike the prior art. In addition, since the plurality of communication holes 101T are arranged at equal intervals in the circumferential surface of the partition wall 101W, the negative pressure condition of the space on the inner side of the partition wall 101W is uniform, so that dust etc. can be effectively drawn through the communication holes 101T.

In the embodiment shown in FIG. 9, the parts thereof corresponding to the first embodiment shown in FIG. 1 and others are identified by the same reference numerals but with addition of the number 100 and a detailed explanation thereof is omitted herein. For example, the lid member 2, the opening 2C, and the box A1 discussed above with respect to the first embodiment of FIG. 1 are shown as the lid member 102, the opening 102C, and the box 100A1.

Third Embodiment

Figure 10:
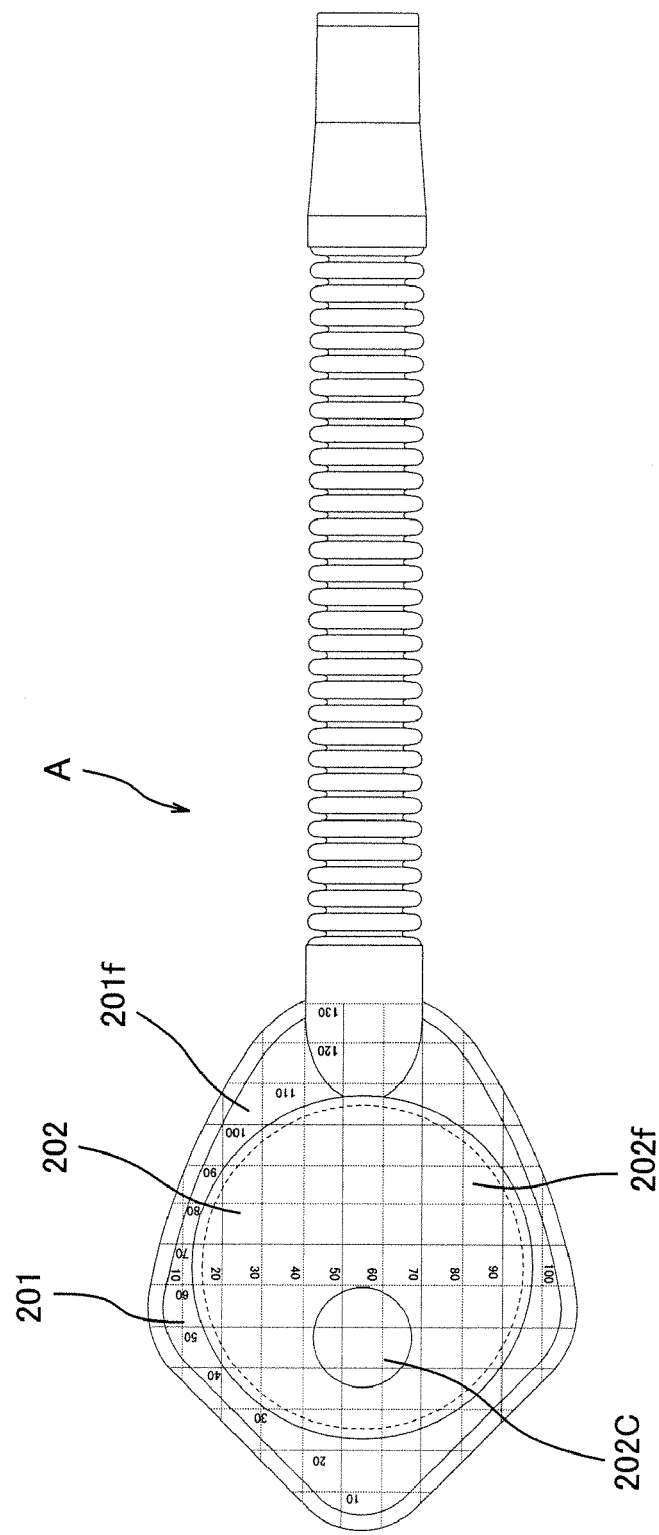
FIG. 10 is a plan view illustrating the structure of a drill dust collector of an embodiment different from that of FIG. 2.

According to a third embodiment, as shown in FIG. 10, a surface (upper face in this embodiment) 201$f$ of a box body 201 of the dust collector A and a surface (lower face in this embodiment) 202$f$ of a lid member 202 are provided with scales respectively which are marked in two directions perpendicular to each other. This makes it possible to position the drill by inserting the drill into an opening 202C formed in a lid member 202, even if a transparent or semi-transparent material is not employed. More concretely, cross lines for positioning are drawn on a working surface of an object to be drilled beforehand and the scale marks of the box body 201 and the lid member 202 are made to match the positioning cross lines with respect to two directions, whereby positioning of the drill is carried out. The third embodiment does not differ from the first embodiment except this point.

It is apparent that the invention is not necessarily limited to the particular embodiments shown herein and various changes and modifications are made to the disclosed embodiments without departing from the spirit and scope of the invention.

INDUSTRIAL APPLICABILITY

The drill dust collector of the invention can be used in operations for drilling holes in objects made from, for instance, metals, stone, cement, wood, composite materials and others.

The invention claimed is:

1. A drill dust collector comprising a box having an opening in a lower surface thereof and has an opening on an upper surface thereof through which a drill is inserted, wherein a suction port for making the inner pressure of said box negative is formed in said box, being connected to the leading end of a suction hose the proximal end of which is connected to a suction apparatus, and wherein a contact member having high flexibility is provided so as to extend around the lower face of said box, wherein a partition wall for partitioning said suction port and said opening so as to make them independent from each other is provided within said box so as to circumferentially extend when viewed in plan, wherein the space located radially outside of said partition wall within said box body is divided into upper and lower spaces independent from each other by a dividing wall, wherein said partition wall is provided with a communication hole for making communication between said suction port and said opening which communication hole is located above said dividing wall, and wherein said contact member having high flexibility is provided at a lower end of said partition wall, said contact member being inclined such that a lower end of the contact member is disposed adjacent to the opening at the lower surface of the box.

2. A drill dust collector comprising a box that opens in a lower surface thereof and has an opening on an upper surface thereof through which a drill is inserted, wherein a suction port for making the inner pressure of said box negative is formed in said box, being connected to the leading end of a suction hose the proximal end of which is connected to a suction apparatus, and wherein a contact member having high flexibility is provided so as to extend around the lower face of said box;

wherein a partition wall for partitioning said suction port and said opening so as to make them independent from each other is provided within said box so as to circumferentially extend when viewed in plan;

wherein the space located radially outside of said partition wall within said box body is divided into upper and lower spaces independent from each other by a dividing wall;

wherein said partition wall is provided with a communication hole for making communication between said suction port and said opening which communication hole is located above said dividing wall;

wherein said box has a lid member composed of said opening and a peripheral portion defining said opening and a box body that is open at said lower face and provided with said suction port, wherein said lid member is arranged so as to be rotatable relative to said box body and said opening is formed at a position the center of which is shifted from the center of rotation of said lid member relative to said box body, and wherein at least a part of said lid member is made from a transparent or semi-transparent material.

3. The drill dust collector according to claim 2, wherein said suction hose is flexible and arranged so as to be integral with said suction port.

4. A drill dust collector comprising a box that opens in a lower surface thereof and has an opening on an upper surface thereof through which a drill is inserted, wherein a suction port for making the inner pressure of said box negative is formed in said box, being connected to the leading end of a suction hose the proximal end of which is connected to a suction apparatus, and wherein a contact member having high flexibility is provided so as to extend around the lower face of said box;
    wherein a partition wall for partitioning said suction port and said opening so as to make them independent from each other is provided within said box so as to circumferentially extend when viewed in plan;
    wherein the space located radially outside of said partition wall within said box body is divided into upper and lower spaces independent from each other by a dividing wall;
    wherein said partition wall is provided with a communication hole for making communication between said suction port and said opening which communication hole is located above said dividing wall; and
    wherein a surface of said box is provided with scale marks aligned at specified intervals.

5. The drill dust collector according to claim 4, wherein said box has, at least at the leading end thereof, an angled part having an angle of 90 degrees or less when viewed in plan.

6. The drill dust collector according to claim 4, wherein said suction port is formed on a side face of said box.

7. The drill dust collector according to claim 4, wherein said dividing wall extends to a joint part of said suction hose.

8. The drill dust collector according to claim 4, wherein said suction hose is flexible and arranged so as to be integral with said suction port.

9. A drill dust collector comprising a box that opens in a lower surface thereof and has an opening on an upper surface thereof through which a drill is inserted, wherein a suction port for making the inner pressure of said box negative is formed in said box, being connected to the leading end of a suction hose the proximal end of which is connected to a suction apparatus, and wherein a contact member having high flexibility is provided so as to extend around the lower face of the said box,
    wherein a partition wall for partitioning said suction port and said opening so as to make them independent from each other is provided within said box so as to circumferentially extend when viewed in plan,
    wherein said partition wall is provided with a communication hole for making communication between said suction port and said opening,
    wherein said box has a lid member composed of said opening and a peripheral portion defining said opening and a box body that is open at said lower face and provided with said suction port,
    wherein said lid member is arranged so as to be rotatable relative to said box body and said opening is formed at a position the center of which is shifted from the center of rotation of said lid member relative to said box body, and
    wherein at least a part of said lid member is made from a transparent or semi-transparent material.

10. A drill dust collector comprising a box that opens in a lower surface thereof and has an opening on an upper surface thereof through which a drill is inserted, wherein a suction port for making the inner pressure of said box negative is formed in said box, being connected to the leading end of a suction hose the proximal end of which is connected to a suction apparatus, and wherein a contact member having high flexibility is provided so as to extend around the lower face of the said box, wherein a partition wall for partitioning said suction port and said opening so as to make them independent from each other is provided within said box so as to circumferentially extend when viewed in plan, wherein said partition wall is provided with a communication hole for making communication between said suction port and said opening, wherein said box has a lid member composed of said opening and a peripheral portion defining said opening and a box body that is open at said lower face and provided with said suction port, wherein said lid member is arranged so as to be rotatable relative to said box body and said opening is formed at a position the center of which is shifted from the center of rotation of said lid member relative to said box body, and wherein a surface of said box is provided with scale marks aligned at specified intervals.

* * * * *